United States Patent [19]

Pierini et al.

[11] Patent Number: 5,302,334
[45] Date of Patent: Apr. 12, 1994

[54] PROCESS FOR COAGULATING AND WASHING LYOTROPIC POLYBENZAZOLE FILMS

[75] Inventors: Peter E. Pierini, Berkeley; Reid H. Bowman, Walnut Creek; Willie E. Rochefort, Hercules; Ming-Biann Liu, Clayton, all of Calif.

[73] Assignee: The Dow Chemical Company, Midland, Mich.

[21] Appl. No.: 887,443

[22] Filed: May 21, 1992

[51] Int. Cl.⁵ ............................... B29C 55/12
[52] U.S. Cl. ......................... 264/233; 264/291; 264/344; 264/289.6; 264/290.2
[58] Field of Search .............. 264/184, 197, 208, 291, 264/210.7, 290.2, 233, 344, 289.6

[56] References Cited

U.S. PATENT DOCUMENTS

| | | |
|---|---|---|
| 3,444,585 | 5/1969 | Watanabe . |
| 3,725,523 | 4/1973 | Bowen . |
| 3,742,104 | 6/1973 | Jamison et al. . |
| 3,767,756 | 6/1972 | Blades . |
| 3,869,429 | 3/1975 | Blades . |
| 3,966,686 | 6/1976 | Asakura et al. . |
| 4,051,108 | 9/1977 | Helminiak et al. . |
| 4,066,731 | 1/1978 | Hungerford . |
| 4,342,715 | 8/1982 | Shimada et al. . |
| 4,374,978 | 2/1983 | Fujiwara et al. . |
| 4,405,550 | 9/1983 | Hungerford . |
| 4,419,317 | 12/1983 | Fujiwara et al. . |
| 4,440,710 | 4/1984 | Fujiwara et al. . |
| 4,487,735 | 12/1984 | Chenevey . |
| 4,554,119 | 11/1985 | Chenevey . |
| 4,606,875 | 8/1986 | Chenevey . |
| 4,702,876 | 10/1987 | Ebregt . |
| 4,728,473 | 3/1988 | Satoh et al. . |
| 4,734,196 | 3/1988 | Kono et al. . |
| 4,842,924 | 6/1989 | Farris et al. . |
| 4,845,150 | 7/1989 | Kovak et al. . |
| 4,857,255 | 8/1989 | Imanishi et al. . |
| 4,859,393 | 8/1989 | Yang et al. . |
| 4,871,500 | 10/1989 | Harms et al. . |
| 4,898,924 | 2/1990 | Chenevey . |
| 4,900,805 | 2/1990 | Arnold et al. . |
| 4,927,909 | 5/1990 | Wadhwa et al. . |
| 4,963,428 | 10/1990 | Harvey et al. . |
| 4,966,806 | 10/1990 | Lusignea et al. . |
| 4,971,744 | 11/1990 | Park et al. . |
| 4,973,442 | 11/1990 | Harvey et al. . |
| 4,977,223 | 12/1990 | Arnold et al. . |
| 5,011,643 | 4/1991 | Yang et al. . |

FOREIGN PATENT DOCUMENTS

| | | |
|---|---|---|
| 61-28530 | 2/1986 | Japan . |
| 62-53339 | 3/1987 | Japan . |
| 63-74612 | 4/1988 | Japan . |
| 63-210138 | 8/1988 | Japan . |
| 1-26646 | 1/1989 | Japan . |
| 1-287141 | 11/1989 | Japan . |

OTHER PUBLICATIONS

AFWAL-TR-80-4142, Part IV. Processing of Rod Like Polymers Part IV. Author: E. C. Chenevey.
AFWAL-TR-85-4135. Processing of Rod Like Polymers-Tubular Films. By: E. C. Chenevey.
AFWAL-8903, Advanced Dielectric Film for Use in Power Filter Capacitors and High Energy Dinsity Capacitors, By: Joseph Piche et al.
Sen-I Gakkaishi, vol. 47, No. 2, 1991 by Takeda et al.; Coagulation Behavior of Poly(P-Phenylenebenzobisoxazole)/Poly(Phospholic Acid) Solution in Solvent-Water Coagulant.

Primary Examiner—Jeffrey Thurlow
Assistant Examiner—Mathieu Vargot
Attorney, Agent, or Firm—Margaret M. Brumm

[57] ABSTRACT

A process for coagulating a polybenzazole film which includes contacting a lyotropic polybenzazole dope film that is constrained in at least two directions with a coagulant under conditions such that the polybenzazole polymer separates as a gelled moiety with the structure set such that further removal of solvent will result in no more than a 5% increase in the force necessary to constrain the film.

6 Claims, No Drawings

PROCESS FOR COAGULATING AND WASHING LYOTROPIC POLYBENZAZOLE FILMS

BACKGROUND OF THE INVENTION

This invention relates to films containing lyotropic polybenzazole polymers and processes for coagulating and washing them.

Polybenzazole polymers are typically synthesized by polymerization in nonoxidizing dehydrating acid solutions to form viscous dopes which are solutions of the polymer in the solvent acid. Uniaxially oriented film may be synthesized from these dopes by extruding onto a rotating drum that draws the film in the machine direction and rotates it down into a water bath to coagulate. Biaxially oriented films are synthesized by extruding the dope as a tube, which is blown or forced over a mandrel to impart some biaxial orientation, and is then immersed in water to coagulate it. Examples of such processes are described in: Chenevey, U.S. Pat. No. 4,487,735 (Dec. 11, 1984); Lusignea et al.,U.S. Pat. No. 4,871,595 (Oct. 3, 1989); Chenevey, U.S. Pat. No. 4,898,924 (Feb. 6, 1990); Harvey et al., U.S. Pat. No. 4,939,235 (Jul. 3, 1990); Harvey et al., U.S. Pat. No. 4,963,428 (Oct. 16, 1990); Lusignea et al., U.S. Pat. No. 4,966,806 (Oct. 30, 1990); and Fujiwara, Japanese Kokai 63(1988)-74612 (published Apr. 5, 1988), which are incorporated herein by reference.

Once the polybenzazole dope film has been formed it must undergo coagulation in order to separate the polybenzazole from its solvent. Coagulation is the process in which a polymer in solution is contacted with a polymer nonsolvent, known as a coagulant, causing phase separation of the polymer into a gelled moiety. A coagulated film has a macroscopic structure that is essentially fixed. After the film has been coagulated it can be further washed in order to remove even more of the acid solvent. The amount of washing the film is subjected to depends upon the desired level of residual acid solvent in the final film.

The coagulated films and sheets may be used in structural materials or electronic components as described in U.S. Pat. No. 4,871,595 (Oct. 3, 1989) and 11 Ency. Poly. Sci. & Eng., *Polybenzothiazoles and Polybenzoxazoles*, 601 (J. Wiley & Sons 1988), which are incorporated herein by reference.

It is necessary to coagulate and wash a dope film to obtain a polybenzazole film with a desired level of residual solvent in order to produce marketplace quality polybenzazole film.

SUMMARY OF THE INVENTION

One aspect of the present invention is a process for coagulating a lyotropic polybenzazole film which includes contacting a lyotropic polybenzazole dope film that is constrained in at least two directions with a coagulant under conditions such that the polybenzazole polymer separates as a gelled moiety with the structure set such that further removal of solvent will result in no more than a 5% increase in the force necessary to constrain the film.

A second aspect of the present invention is a process for coagulating a lyotropic polybenzazole film which includes contacting a lyotropic polybenzazole dope film that is constrained in at least two directions with a coagulant under conditions such that the polybenzazole polymer separates as a gelled moiety with the structure set such that further removal of solvent will result in no more than a 5% increase in the force necessary to constrain the film, and removing some of the constraint on the film such that the film is constrained in at most one direction; and subjecting the coagulated film to washing with a suitable washing medium under conditions such that the desired level of residual solvent in the film is reached while ensuring that the film is not allowed to dry out until said desired levels of residual solvent in the film have been reached.

A third aspect of the present invention is a process for coagulating a lyotropic polybenzazole film which includes contacting a lyotropic polybenzazole dope film that is constrained in at least two directions with a coagulant under conditions such that the polybenzazole polymer separates as a gelled moiety with the structure set such that upon release of constraint further removal of solvent will result in no more than 5% shrinkage of the coagulated film.

DETAILED DESCRIPTION OF THE INVENTION

As used in this application, the terms listed have the following definitions:

"dope" is a solution of polybenzazole polymer material in a solvent (at any polymer concentration), "dope film/sheet" is dope material formed into a film or sheet by some mechanical operation (i.e. cast onto a flat surface or extruded through a film/sheet die), "extruded dope film and/or sheet" is dope material which has been formed into a film/sheet by extrusion through a film die, "oriented dope film" is dope material into which orientation has been imparted by some stretching operation (e.g. tentering, blown film process, or by a counter-rotating blown film process), "coagulated film" means a film with a gelled structure set such that further removal of solvent will result in less than a 5% increase in the force necessary to constrain the film (i.e., less than 5% shrinkage upon release of the constrained film), "coagulant" is a polymer nonsolvent used to remove and/or displace solvent (acid) from the film in either the coagulation or washing phases, "residual solvent" is that part of the solvent acid, or associated species, still remaining in the polybenzazole film after the film has been coagulated, "washing" is that part of the process in which the residual solvent level in the coagulated polybenzazole film is reduced to the desired level for the final film application, "lyotropic" means a material that changes the phase that it is in depending on its concentration in solution, "polybenzazole" is a lyotropic liquid crystal polymer that is isotropic at low polymer concentrations and anisotropic beyond a certain critical polymer concentration, which for a given polymer is dependent on the acid solvent chosen and temperature. Typically, there is a broad biphasic region in which there is a mixture of isotropic and anisotropic material. An example of a lyotropic liquid crystalline polymer is polybenzoxazole 14 wt % dissolved in polyphosphoric acid.

The present invention uses dopes containing polybenzoxazole ("PBO") or polybenzothiazole ("PBT") or copolymers thereof, dissolved in a solvent. PBO, PBT and random, sequential and block copolymers of PBO and PBT are described in references such as Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Evers, *Thermoxodatively Stable Articulated p-Benzobisoxazole and p-Benzobisthiazole Polymers*, U.S. Pat. No. 4,359,567 (Nov. 16, 1982); Tsai et al., *Method for Making Heterocyclic Block Copolymer*, U.S. Pat. No. 4,578,432 (Mar. 25, 1986); 11 Ency. Poly. Sci. & Eng., *Polybenzothiazoles and Polybenzoxazoles*, 601 (J. Wiley & Sons 1988) and W. W. Adams et al., *The Materials Science and Engineering of Rigid-Rod Polymers* (Materials Research Society 1989), which are incorporated herein by reference.

POLYBENZAZOLE POLYMERS

The polymer may contain AB-mer units, as represented in Formula 1(a), and/or AA/BB-mer units, as represented in Formula 1(b)

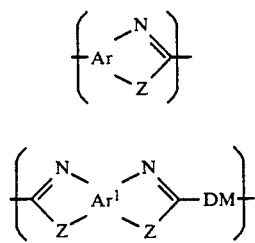

1(a) AB

1(b) AA/BB wherein:

Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bis-phenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11 Ency. Poly. Sci. & Eng., supra, at 602.

The polymer preferably consists essentially of either AB-PBZ mer units or AA/BB-PBZ mer units, and more preferably consists essentially of AA/BB-PBZ mer units. The polybenzazole polymer may be rigid rod, semi-rigid rod or flexible coil. It is preferably rigid rod in the case of an AA/BB-PBZ polymer or semi-rigid in the case of an AB-PBZ polymer. It preferably forms lyotropic liquid crystalline solutions in a suitable solvent above a critical concentration point. Azole rings within the polymer are preferably oxazole rings (Z=0). Preferred mer units are illustrated in Formulae 2 (a)–(g). The polymer more preferably consists essentially of mer units selected from those illustrated in 2(a)–(h), and most preferably consists essentially of a number of identical units selected from those illustrated in 2(a)–(d).

2

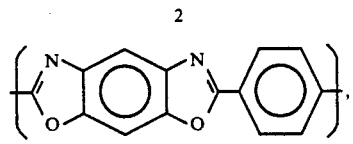 (a)

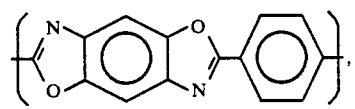 (b)

2

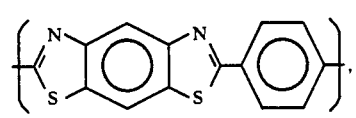 (c)

Each polymer preferably contains on average at least about 25 mer units, more preferably at least about 50 mer units and most preferably at least about 100 mer units. The intrinsic viscosity of rigid AA/BB-PBZ

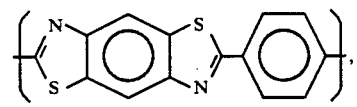 (d)

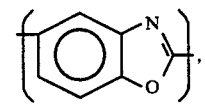 (e)

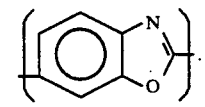 (f)

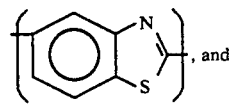 (g)

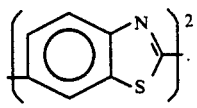

(h)

polymers is methanesulfonic acid at 25° C. is preferably at least about 10 dL/g, more preferably at least about 15 dL/g and most preferably at least about 20 dL/g. For some purposes, an intrinsic viscosity of at least about 25 dL/g or 30 dL/g may be best. Intrinsic viscosity of 60 dL/g or higher is possible, but the intrinsic viscosity is preferably no more than about 40 dL/g. The intrinsic viscosity of semi-rigid AB-PBZ polymers is preferably at least about 5 dL/g, more preferably at least about 10 dL/g and most preferably at least about 15 dL/g.

FORMING A POLYBENZAZOLE DOPE

The polybenzazole polymer or copolymer is polymerized in a solvent. Solutions of polybenzazole in a solvent are commonly referred to as a dope. The polybenzazole polymer or copolymer dope can be formed into a shaped article such as a fiber or film and, if desired, this polybenzazole fiber or film can be dissolved in a solvent.

Some polybenzoxazole and polybenzothiazole polymers are soluble in cresol, but the solvent is preferably an acid capable of dissolving the polymer. The acid is preferably nonoxidizing. Examples of suitable acids include polyphosphoric acid, methanesulfonic acid and 100% sulfuric acid, and mixtures of those acids. The acid is preferably polyphosphoric acid or methanesulfonic acid, and is more preferably polyphosphoric acid. The polybenzazole/polyphosphoric acid dopes that are used in this invention are lyotropic liquid crystalline solutions.

The dope should contain a high enough concentration of polymer for the polymer to coagulate to form a film of the desired thickness without substantial flaws. When the polymer is a lyotropic polymer, then the concentration of polymer in the dope is preferably high enough to provide a dope that contains liquid crystalline domains. The concentration of the polymer is preferably at least about 7 weight percent, more preferably at least about 10 weight percent and most preferably at least about 14 weight percent. The maximum concentration is limited primarily by practical factors, such as polymer solubility and dope viscosity. The concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985); Sybert et al., U.S. Pat. No. 4,772,678 (Sep. 20, 1988); Harris, U.S. Pat. No. 4,847,350 (Jul. 11, 1989); and Ledbetter et al., "An Integrated Laboratory Process for Preparing Rigid Rod Fibers from the Monomers," *The Materials Science and Engineering of Rigid-Rod Polymers* at 253-64 (Materials Res. Soc. 1989), which are incorporated herein by reference. In summary, suitable monomers (AA-monomers and BB-monomers or AB-monomers) are reacted in a solution of nonoxidizing and dehydrating acid under nonoxidizing atmosphere with vigorous mixing and high shear at a temperature that is increased in step-wise or ramped fashion from no more than about 120° C. to at least about 190° C. Examples of suitable AA-monomers include terephthalic acid and analogs thereof. Examples of suitable BB-monomers include 4,6-diaminoresoreinol, 2,5-diaminohydroquinone, 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4-aminobenzoic acid and analogs thereof, typically stored as acid salts.

FORMING A POLYBENZAZOLE FILM

Forming a polybenzazole film can be as simple as using hand cast methods to spread the polybenzazole dope out onto a relatively flat surface. It also can involve complex machinery that first extrudes the film through a die and then stretches the film to orient the polymer. (Whether the film is merely cast or extruded and then oriented, all lyotropic polybenzazole films need to be coagulated before they can be used.)

The following is a description of a process to form an extruded and oriented dope film. The three-step process described in jointly owned co-pending U.S. patent application Ser. No. 670,135 converts polymer dopes into oriented dope films. In the first step, the dope is extruded as a dope film or sheet which is relatively thick and is relatively narrow in the transverse direction, as compared with the final desired film. The extruded dope film is preferably left as a continuous sheet, rather than cutting into discrete sections.

The dope film or sheet should be thick enough that it can be stretched as desired without leaving flaws after coagulation. The optimum thickness varies considerably depending upon the desired thickness of the final product and the desired stretch from the second step of the process, keeping in mind that the thickness of the dope film as extruded will decrease as much as tenfold as the dope film is first oriented, then coagulated. For most purposes, the oriented dope film or sheet is preferably at least about 1 mil thick, more preferably at least about 5 mil thick, and most preferably at least about 25 mil thick. The dope film or sheet is preferably no more than about 250 mil thick and more preferably at most about 100 mil thick. (Ordinarily, the term "film" refers to an article no more than about 10-15 mil thick, and the term "sheet" refers to an article greater than about 10-15 mil thick. This Application shall use the term "film" to refer to both film and sheet.)

It may optionally be desirable to sandwich the extruded dope film between two layers of a stretchable polymer film which is inert with respect to the dope under process conditions. Examples of a suitable polymer film include Teflon ® fluorocarbon film or amorphous polyester film. The outer layers of the stretchable polymer film protect the dope from the atmosphere and prevent it from adhering to itself or other objects if the dope is stored after extrusion. By being able to extrude the film directly between two layers of a stretchable polymer film it is possible to store a freshly extruded dope film rather than having to tenter a directly extruded dope film immediately. The process as described in jointly owned co-pending U.S. application Ser. No. 670,135, does allow for storage of the film at any stage of the process.

TENTERING (STRETCHING) THE FILM

In this step, which is optional, the dope film is mechanically stretched, this stretching process being known as tentering. This stretching process takes place in at least the transverse direction to form an oriented dope film. Tentering of a polybenzazole film is accomplished in a manner similar to the tentering of known thermoplastic polymers. Tentering of a polybenzazole film is accomplished by having a mechanical device grip the transverse edges of the dope film and pull these transverse edges apart. The dope film may also be stretched in the machine direction and/or in any other direction. Stretching should be carried out at a temperature and at a rate at which the dope film can tolerate stretching without it tearing.

For liquid crystalline dopes containing polyphosphoric acid (this polyphosphoric acid being 82-85 percent phosphorus pentoxide ("$P_2O_5$")) and 14 weight percent rigid rod polybenzoxazole or polybenzothiazole, the temperature for tentering is preferably at least about 20° C., more preferably at least about 50° C. and most preferably at least about 75° C. It is preferably at most about 175° C., more preferably at most about 150° C. and most preferably at most about 125° C. The optimal rate of stretching varies widely depending upon a number of factors such as polymer structure, molecular weight and concentration, solvent acid, and dope temperature. It can best be determined by experiment.

COAGULATION

In order to be used, eventually the dope film (stretched or unstretched) must be coagulated to yield a polybenzazole film that can be used in applications. Ordinarily the dope film is coagulated by contacting the film with a coagulant that is a nonsolvent for the polymer.

CONSTRAINT

It has been found that coagulation of a polybenzazole polymer dope film must take place while the film is constrained in order to prevent uncontrolled shrinkage of the coagulated film. In order to prevent uncontrolled shrinkage it has been found that the film must be constrained in at least two of the three possible dimensions (or "directions"). Typically the film is constrained in the machine direction ("MD") and the direction perpendicular to the machine direction which is known as the transverse direction ("TD"). As constraint of the film in two directions is an expensive unit operation, compared to constraining the film in only one direction, it is desirable for economic reasons to minimize the amount of time the film must be constrained in more than one direction.

When the film is constrained to prevent shrinkage by gripping along each of its edges, the increase in force necessary to maintain the film at constant dimensions during the coagulation is an indirect measure of the amount of shrinkage that would occur if the film were not constrained. The time for the measured force to come to an equilibrium level is a direct measure of the time necessary to constrain the film to prevent shrinkage upon release. That is, if the force necessary to constrain the film is changing with time, then it can be inferred that there would be shrinkage (collapse of structure) in the film if it were not constrained. Similarly, if the measured force is approximately constant with time, then it can be inferred that there would be minimal shrinkage in the film if the constraints were released.

Thus, in this coagulation process, the film must be constrained in at least two directions until it has coagulated for sufficient time so as to have no appreciable shrinkage upon release of constraint and further removal of solvent. Once coagulation is completed, some of the constraint on the film can be removed such that the film is constrained in at most one direction. Typically, once coagulation is complete, the constraint on the film in the transverse direction is removed, leaving the film constrained in only the machine direction. (Constraint on the film in the machine direction can be as simple a force as the tension imparted to the film as it is moved through usual film handling equipment such as rollers and winders.)

How much coagulation has taken place in the film can be directly inferred by measuring the restraining force on the constrained film. As stated previously, one definition of a coagulated film is a film that will have no more than a 5% increase in the force necessary to constrain the film with further removal of solvent. A second definition of a coagulated film is a film with the structure set that upon release of constraint further removal of solvent will result in no more than 5% shrinkage in the film.

COAGULANT

The coagulating liquid must be a nonsolvent for the polybenzazole polymer. It may be an organic material, such as methanol, glycerol or acetone, but it is preferably aqueous. The aqueous coagulant can be water alone, mixtures of acid(s) and water, mixtures of base(s) and water or mixtures of salt(s) and water. The temperature of an aqueous coagulant alone is preferably from 5°-95° C., more preferably from 20° C.-80° C., and most preferably about 25° C.

Mixtures of acid and water used as a coagulant are preferably mixtures of phosphoric acid and water. The concentration of phosphoric acid in water is preferably from 1-85 percent, more preferably 5-50 percent, and most preferably 5-30 percent. The preferred temperature range for coagulant made up of acid and water is from 5° C-95° C., the more preferred temperature is 15° C.-45° C., and the most preferred temperature is about 25° C.

Exposing the uncoagulated film to one coagulant is one technique to achieve a coagulated film. Another such technique is to expose the uncoagulated film to more than one coagulant in a sequenced order. For example, it is possible to coagulate a film using a mixture of phosphoric acid and water only. It is also possible and preferable to use first a mixture of phosphoric acid and water and then pure water as the coagulants in a sequenced manner. This sequence of exposure to first different concentration water/acid coagulants, followed by exposure to a water coagulant is preferably run in a countercurrent manner.

Coagulation of polybenzazole films can also occur with the film being exposed to different coagulants in a sequenced order.

The time that the polybenzazole film must be constrained in at least two directions during coagulation is dependent on the thickness of the film. For example, an oriented polybenzazole ("PBZ") dope film with an uncoagulated thickness of 5 mils or less usually requires approximately one minute of contact with an aqueous coagulant in order for the film to be coagulated sufficiently so that once some of the constraint is removed such that the film is constrained in at most one direction the film will experience no more than 5% further shrinkage upon removal of residual solvent. A PBZ film with a thickness of from 5-8 mils usually requires more than one minute and less than two minutes in contact with an aqueous coagulant to be coagulated sufficiently so that once some of the constraint is removed such that the film is constrained in at most one direction the film will experience no more than 5% further shrinkage upon removal of residual solvent. A polybenzazole film thicker than 8 mils usually requires more than 2 minutes and less than five minutes to be coagulated sufficiently so that once some of the constraint is removed such that the film is constrained in at most one direction the film will experience no more than 5% further shrinkage upon removal of residual solvent.

The time that the polybenzazole film must be constrained in at last two directions during coagulation in an acid/water coagulant is dependent on the acid concentration. The residence time for coagulation of a 5 mil oriented polybenzazole dope film in 10-30 percent phosphoric acid/water is usually about 2 minutes, and in 5 percent phosphoric acid/water is usually about 1 minute.

For thin polybenzazole dope films (<5 mils) the time for coagulation is approximately constant (<60 sec) for any different temperature of the coagulant. For films thicker than 5 mils, it has been found that the time that the polybenzazole film must be constrained in at least two directions during coagulation in an acid/water mixture decreases as the temperature of the acid/water mixture increases.

Further enhancement of the coagulation process can be achieved by adding a suitable surfactant to the coagulant to aid in contacting the film with the coagulant. One such suitable surfactant is sodium lauryl sulfate. The amount of surfactant in the coagulant is preferably less than 1000 ppm, more preferably less than 500 ppm and most preferably less than 100 ppm.

The coagulation process can be further enhanced by stirring the coagulant to aid in contacting the film with the coagulant. Stirring methods can range from mechanical stirring with a simple stirring implement to ultrasonic stimulation of the coagulant to cause movement therein. A reasonable amount of time to ultrasonically stimulate the coagulant is preferably up to 5 minutes, more preferably up to 20 minutes and most preferably up to 30 minutes.

The end of the coagulation process is defined as when the film has been coagulated such that further removal of solvent will result in less than a 5% increase in the force necessary to constrain the film. A second definition for the end of the coagulation process is when the film has been coagulated such that further removal of solvent will result in less than 5% shrinkage in the film. The film may be contacted by the coagulant by either running the film through a bath of the coagulant or by spraying the film with coagulant or any combination of baths or sprays. After coagulation has been completed the coagulated film no longer needs to be constrained in at least two directions.

WASHING THE COAGULATED FILM

Once the film has been coagulated, it can be washed to remove residual amounts of solvent. As previously defined, "washing" is that part of the process in which the residual solvent level in the coagulated polybenzazole film is reduced to the desired level. Typically this residual solvent is a phosphorus containing species such as phosphoric acid or polyphosphoric acid. For example, a typical coagulated film still contains about 2500-5000 ppm phosphorus. It is desirable to have less than 2500 ppm phosphorus in polybenzazole films in order for the films to be useful in certain electronics applications.

The film may be washed by running the film through a bath, or spraying the film with a washing medium, or exposing the film to steam in any type of standard steam chamber or any combination of the above. It has been found that water (cold or hot), dilute acid/water mixtures (cold or hot), and/or steam are useful for washing residual solvent from polybenzazole film. Additional suitable washing materials include mixtures of dilute base(s) and water or dilute salt(s) and water. It is important that the polybenzazole film be kept wet before and during the washing process because it is very difficult to further remove residual solvent from the film once it has been allowed to dry.

Again, as with coagulation, the film may be exposed to a staged sequence of different washing materials. As with coagulation there may be some acid in the first such washing bath or spray applied to the film, but the final washing baths or sprays should be acid free in order to enhance removal of residual solvent.

As with coagulation, enhancement of residual solvent removal can take place if a surfactant is added to the washing medium or the washing medium is subjected to stirring. As with coagulation a suitable surfactant is sodium lauryl sulfate. As with coagulation a suitable stirring method is ultrasonic stimulation.

The film recovered from this process contains polybenzazole polymer as previously described, and preferably consists essentially of polybenzazole polymer. It may be very thin, for instance suitable for membrane purposes, or thicker to be suitable for structural purposes. Once the film has been coagulated and washed it may optionally undergo the further unit operations of drying and heat treatment.

Typically, for polyphosphoric acid used as the solvent, the residual phosphorus level in the finished film is preferably less than 3000 ppm, more preferably less than 1500 ppm, and most preferably less than 500 ppm.

The films are useful as substrates for magnetic recording media, coatings, structural materials (including insulation), membranes, and parts of electronic components.

The process of the present invention is more specifically illustrated in the following Examples.

EXAMPLE 1

Measurement of Forces Generated During Constrained Coagulation and Washing of Oriented PBO Dope Film Polybenzobisoxazole ("PBO") dope (14% PBO in polyphosphoric acid ("PPA") is extruded through a film die, taken-up between rollers, sandwiched between Teflon ® fluoropolymer sheets (3 mil) for ease of handling, and stored in a nitrogen purged glove box until use. The dope films are stretched unsupported (Teflon ® fluoropolymer sheets removed), with the stretching always done in the simultaneous biaxial mode. The stretch history varies from 2x to 7x in either the machine direction ("MD") or transverse direction to ("TD") and the stretched films are stored between Teflon ® fluoropolymer sheets in a nitrogen purged glove box until use in the coagulation frame.

TENTER FRAME

An instrumented tenter frame exists for the purpose of studying the forces necessary to dimensionally constrain PBO film during coagulation. In this frame there are compression load cells in both the X and Y directions attached by tension rods to cross-bars with clamps to hold the film in place. The load cells have an actual working range of 50 lbs. with ±0.1 lb. accuracy. The load cells and accompanying electronics are sealed-off from the outside environment with Viton diaphragms and tubing. The entire frame assembly is constructed of 316SS with several poly-ether-ether-ketone and Teflon ® fluoropolymer components, in order to be resistant to the acid/water coagulation baths. Loading the coagulation frame is accomplished by laying the stretched dope film horizontally across the frame and clamping the film in place. Six inch by six inch pieces of film (inside dimension) fit into the frame. After the film is loaded onto the frame, the cross-bar restraining screws are removed, releasing the cross-bars, which allow for the force to be read on the load cells. If the film shows any slack, the cross-bars are tightened until the film was taut. Typical initial load cell readings did not exceed 1 to 2 pounds for thin films. The data recording devices are started (two points per second acquisition rate), and the frame is placed horizontally in a plastic tub filled with 12 gallons of coagulant, which completely covered the frame.

CONSTRAINED COAGULATION

The basic experiment consists of constraining the film in both the X and Y directions (i.e., clamping all four sides) during a 20 minute room temperature water coagulation and monitoring the restraining force. The normalized transverse direction (TD) force vs time data for films of varying thickness are summarized in Table 1. For simplicity only the TD data are shown but the same trends can be seen in the MD data. The data are normalized to the equilibrium force level and appear to fall roughly into two groups based on film thickness. The thin films (less than 5 mils) reach equilibrium very quickly, while the thicker films have a more gradual rise to equilibrium. These data show that the time to reach the equilibrium force plateau is a strong function of the film thickness.

Once the equilibrium force plateau has been reached the constraint can be released with minimal shrinkage. This is tested by releasing films that have reached the equilibrium plateau and washing them an additional 24 hrs. unconstrained. Less than 2% shrinkage in either direction is observed.

TABLE 1

Normalized Transverse Direction Force (F/Fequilibrium) as a Function of Coagulation Time for PBO Dope Films of Varying Thickness (all film thicknesses specified are the thickness of the film before coagulation)

| Time (sec) | F/Feq |
|---|---|
| 2.5 mil PBO Film | |
| 0.00 | 0.00 |
| 2.00 | 0.0667 |
| 3.00 | 0.600 |
| 4.00 | 0.867 |
| 5.00 | 0.933 |
| 6.00 | 0.933 |
| 7.00 | 0.933 |
| 8.00 | 1.00 |
| 9.00 | 1.00 |
| 10.0 | 0.933 |
| 11.0 | 1.00 |
| 12.0 | 1.00 |
| 13.0 | 1.00 |
| 14.0 | 1.00 |
| 15.0 | 1.00 |
| 18.0 | 1.00 |

TABLE 1-continued

Normalized Transverse Direction Force (F/Fequilibrium) as a Function of Coagulation Time for PBO Dope Films of Varying Thickness (all film thicknesses specified are the thickness of the film before coagulation)

| Time (sec) | F/Feq |
|---|---|
| 20.0 | 1.07 |
| 22.0 | 1.07 |
| 24.0 | 1.07 |
| 26.0 | 1.07 |
| 28.0 | 1.07 |
| 30.0 | 1.07 |
| 35.0 | 1.00 |
| 40.0 | 1.00 |
| 50.0 | 1.07 |
| 60.0 | 1.00 |
| 70.0 | 1.07 |
| 80.0 | 1.07 |
| 90.0 | 1.00 |
| 3 mil PBO Film | |
| 0.00 | 0.00 |
| 1.00 | 0.0541 |
| 2.00 | 0.135 |
| 3.00 | 0.270 |
| 4.00 | 0.378 |
| 5.00 | 0.541 |
| 6.00 | 0.595 |
| 7.00 | 0.649 |
| 8.00 | 0.676 |
| 9.00 | 0.730 |
| 10.0 | 0.757 |
| 11.0 | 0.784 |
| 13.0 | 0.838 |
| 15.0 | 0.865 |
| 17.0 | 0.892 |
| 19.0 | 0.919 |
| 21.0 | 0.946 |
| 26.0 | 0.946 |
| 31.0 | 0.946 |
| 36.0 | 0.946 |
| 41.0 | 0.946 |
| 51.0 | 0.973 |
| 61.0 | 0.973 |
| 71.0 | 0.973 |
| 81.0 | 1.00 |
| 91.0 | 1.00 |
| 4 mil PBO Film | |
| 0.00 | 0.00 |
| 2.00 | 0.0250 |
| 3.00 | 0.225 |
| 4.00 | 0.400 |
| 5.00 | 0.525 |
| 6.00 | 0.600 |
| 7.00 | 0.700 |
| 8.00 | 0.800 |
| 9.00 | 0.875 |
| 10.0 | 0.925 |
| 11.0 | 0.950 |
| 12.0 | 0.975 |
| 13.0 | 0.975 |
| 14.0 | 1.00 |
| 15.0 | 1.00 |
| 16.0 | 1.00 |
| 17.0 | 1.00 |
| 18.0 | 1.00 |
| 19.0 | 1.00 |
| 20.0 | 1.00 |
| 21.0 | 0.975 |
| 22.0 | 0.975 |
| 23.0 | 0.975 |
| 24.0 | 0.975 |
| 25.0 | 0.975 |
| 30.0 | 0.950 |
| 35.0 | 0.975 |
| 40.0 | 0.950 |
| 45.0 | 0.950 |
| 50.0 | 0.950 |
| 55.0 | 0.950 |
| 60.0 | 0.950 |
| 65.0 | 0.950 |
| 70.0 | 0.925 |
| 75.0 | 0.925 |

TABLE 1-continued

Normalized Transverse Direction Force (F/Fequilibrium) as a Function of Coagulation Time for PBO Dope Films of Varying Thickness (all film thicknesses specified are the thickness of the film before coagulation)

| Time (sec) | F/Feq |
|---|---|
| 80.0 | 0.950 |
| 85.0 | 0.925 |
| 90.0 | 0.925 |
| 5 mil PBO Film | |
| 0.00 | 0.00 |
| 2.00 | 0.156 |
| 3.00 | 0.289 |
| 4.00 | 0.356 |
| 5.00 | 0.422 |
| 6.00 | 0.467 |
| 7.00 | 0.511 |
| 8.00 | 0.556 |
| 9.00 | 0.578 |
| 10.0 | 0.622 |
| 11.0 | 0.644 |
| 13.0 | 0.689 |
| 15.0 | 0.733 |
| 17.0 | 0.756 |
| 19.0 | 0.778 |
| 21.0 | 0.800 |
| 23.0 | 0.822 |
| 25.0 | 0.844 |
| 27.0 | 0.844 |
| 29.0 | 0.867 |
| 31.0 | 0.867 |
| 36.0 | 0.889 |
| 41.0 | 0.933 |
| 46.0 | 0.956 |
| 51.0 | 0.956 |
| 56.0 | 0.978 |
| 61.0 | 0.978 |
| 66.0 | 0.978 |
| 71.0 | 0.978 |
| 76.0 | 0.978 |
| 81.0 | 0.978 |
| 86.0 | 1.00 |
| 91.0 | 0.978 |
| 6 mil PBO Film | |
| 0.00 | 0.00 |
| 2.00 | 0.0882 |
| 3.00 | 0.132 |
| 4.00 | 0.206 |
| 6.00 | 0.265 |
| 8.00 | 0.309 |
| 10.0 | 0.368 |
| 12.0 | 0.412 |
| 14.0 | 0.456 |
| 16.0 | 0.500 |
| 18.0 | 0.529 |
| 20.0 | 0.559 |
| 25.0 | 0.603 |
| 30.0 | 0.662 |
| 35.0 | 0.706 |
| 40.0 | 0.750 |
| 45.0 | 0.794 |
| 50.0 | 0.824 |
| 55.0 | 0.853 |
| 60.0 | 0.868 |
| 65.0 | 0.882 |
| 70.0 | 0.912 |
| 75.0 | 0.926 |
| 80.0 | 0.941 |
| 90.0 | 0.956 |
| 100 | 0.971 |
| 110 | 0.985 |
| 120 | 1.00 |
| 130 | 1.00 |
| 140 | 1.01 |
| 8 mil PBO Film | |
| 0.00 | 0.00 |
| 2.00 | 0.0374 |
| 4.00 | 0.0935 |
| 6.00 | 0.150 |
| 8.00 | 0.196 |
| 10.0 | 0.243 |
| 12.0 | 0.290 |
| 14.0 | 0.336 |
| 16.0 | 0.374 |
| 18.0 | 0.411 |
| 20.0 | 0.449 |
| 22.0 | 0.486 |
| 24.0 | 0.514 |
| 26.0 | 0.542 |
| 28.0 | 0.570 |
| 30.0 | 0.598 |
| 32.0 | 0.617 |
| 34.0 | 0.636 |
| 36.0 | 0.664 |
| 38.0 | 0.682 |
| 40.0 | 0.701 |
| 45.0 | 0.738 |
| 50.0 | 0.776 |
| 55.0 | 0.794 |
| 60.0 | 0.832 |
| 65.0 | 0.860 |
| 70.0 | 0.879 |
| 75.0 | 0.897 |
| 80.0 | 0.907 |
| 85.0 | 0.925 |
| 90.0 | 0.935 |
| 95.0 | 0.944 |
| 100 | 0.953 |
| 105 | 0.963 |
| 110 | 0.972 |
| 120 | 0.981 |
| 11 mil PBO Film | |
| 0.00 | 0.00 |
| 2.00 | 0.00645 |
| 4.00 | 0.0258 |
| 6.00 | 0.0516 |
| 8.00 | 0.0774 |
| 10.0 | 0.110 |
| 13.0 | 0.161 |
| 16.0 | 0.213 |
| 19.0 | 0.258 |
| 22.0 | 0.297 |
| 25.0 | 0.335 |
| 28.0 | 0.368 |
| 31.0 | 0.406 |
| 34.0 | 0.445 |
| 37.0 | 0.477 |
| 40.0 | 0.503 |
| 45.0 | 0.555 |
| 50.0 | 0.600 |
| 55.0 | 0.639 |
| 60.0 | 0.677 |
| 65.0 | 0.703 |
| 70.0 | 0.729 |
| 75.0 | 0.755 |
| 80.0 | 0.774 |
| 85.0 | 0.787 |
| 90.0 | 0.800 |
| 95.0 | 0.813 |
| 100 | 0.826 |
| 105 | 0.839 |
| 110 | 0.845 |
| 115 | 0.852 |
| 120 | 0.858 |
| 125 | 0.871 |
| 130 | 0.871 |
| 135 | 0.877 |
| 140 | 0.884 |
| 145 | 0.890 |
| 150 | 0.890 |
| 155 | 0.897 |
| 160 | 0.903 |
| 165 | 0.910 |
| 170 | 0.916 |
| 175 | 0.916 |
| 180 | 0.923 |
| 185 | 0.923 |
| 190 | 0.929 |

TABLE 1-continued

Normalized Transverse Direction Force (F/Fequilibrium) as a Function of Coagulation Time for PBO Dope Films of Varying Thickness (all film thicknesses specified are the thickness of the film before coagulation)

| Time (sec) | F/Feq |
|---|---|
| 195 | 0.929 |
| 200 | 0.929 |
| 205 | 0.935 |
| 210 | 0.935 |
| 215 | 0.935 |
| 220 | 0.935 |
| 225 | 0.942 |
| 230 | 0.942 |
| 235 | 0.942 |
| 240 | 0.942 |
| 14 mil PBO Film | |
| 0.00 | 0.00 |
| 1.00 | 0.00510 |
| 2.00 | 0.00510 |
| 3.00 | 0.0318 |
| 4.00 | 0.0510 |
| 5.00 | 0.0764 |
| 6.00 | 0.127 |
| 7.00 | 0.121 |
| 8.00 | 0.127 |
| 10.0 | 0.153 |
| 12.0 | 0.191 |
| 14.0 | 0.229 |
| 16.0 | 0.268 |
| 18.0 | 0.306 |
| 20.0 | 0.344 |
| 22.0 | 0.376 |
| 24.0 | 0.414 |
| 26.0 | 0.446 |
| 28.0 | 0.478 |
| 30.0 | 0.503 |
| 32.0 | 0.535 |
| 34.0 | 0.561 |
| 36.0 | 0.586 |
| 38.0 | 0.611 |
| 40.0 | 0.637 |
| 42.0 | 0.656 |
| 44.0 | 0.682 |
| 46.0 | 0.701 |
| 48.0 | 0.720 |
| 50.0 | 0.739 |
| 52.0 | 0.758 |
| 54.0 | 0.777 |
| 56.0 | 0.796 |
| 58.0 | 0.815 |
| 61.0 | 0.834 |
| 64.0 | 0.860 |
| 67.0 | 0.885 |
| 70.0 | 0.904 |
| 73.0 | 0.924 |
| 76.0 | 0.943 |
| 79.0 | 0.962 |
| 82.0 | 0.975 |
| 85.0 | 0.987 |
| 88.0 | 1.00 |
| 91.0 | 1.01 |
| 94.0 | 1.02 |
| 97.0 | 1.03 |
| 100 | 1.03 |
| 103 | 1.04 |
| 106 | 1.04 |
| 109 | 1.04 |
| 112 | 1.04 |
| 115 | 1.05 |
| 118 | 1.05 |

COMPARATIVE EXAMPLE I

As a control experiment, several pieces of stretched film are coagulated unconstrained.

A 4xMD/4xTD biaxial stretched film shrank about 8.8% in both directions after 20 minutes coagulation. After an additional 24 hours in water this film had shrunk a total of 11% in both directions.

A 7xMD/2.5xTD stretched film shrank about 5% in the machine direction (MD) and 21% in the transverse direction (TD) after being coagulated for 20 minutes. After an additional 24 hours in water the film had shrunk a total of 33% in the TD but showed no additional shrinkage beyond 5% in the MD.

EXAMPLE 2

Determination of Shrinkage during Coagulation and Washing of PBO Dope Film using Water and Acid/Water Coagulants The film is prepared in a manner similar to that described in Example 1. The starting dope film thickness is 50 mils, and the film is stretched 5xMD/5xTD in the simultaneous biaxial mode, yielding a stretched dope film thickness of approximately 2 mils. The films are mounted on 4" squares (constrained coagulation) and several different coagulation schemes are followed to examine the film shrinkage at different times in the process. The two coagulants used are water and 30% $H_3PO_4/H_2O$.

The following experiments are conducted on the 4" squares of 2 mil stretched dope film:

a) 30 sec. in 30% $H_3PO_4/H_2O \rightarrow$ released from constraint in the transverse direction (TD)$\rightarrow$5 min. water$\rightarrow$no shrinkage observed.

b) 120 sec. in 30% $H_3PO_4/H_2O \rightarrow$ released from constraint in the transverse direction (TD)$\rightarrow$5 min. water$\rightarrow$no shrinkage observed.

c) 120 sec in 30% $H_3PO_4/H_2O \rightarrow$ released from constraint in the transverse direction (TD)$\rightarrow$60 min. water$\rightarrow$no shrinkage observed.

d) released from constraint in the transverse direction (TD)$\rightarrow$20 min. in 30% $H_3PO_4/H_2O \rightarrow$ approximately 12% shrinkage measured.

e) released from constraint in the transverse direction (TD)$\rightarrow$20 min in water$\rightarrow$approximately 19% shrinkage measured.

f) 60 sec. in 85% $H_3PO_4 \rightarrow$ released from constraint in the transverse direction (TD)$\rightarrow$8 days storage in Ziploc ® bag$\rightarrow$24 hrs $H_2O \rightarrow$no shrinkage observed.

A 70 mil dope film is prepared in a similar manner but was given a 6.5xMD/6.5xTD simultaneous biaxial stretch and then mounted on a 15" square frame. The following coagulation and washing scheme is used: 30 sec. in 30% PA/water$\rightarrow$removed from all constraint$\rightarrow$20 min. water$\rightarrow$<1% shrinkage measured in either TD or MD.

EXAMPLE 3

Spray Coagulation of PBO Dope Film Using Room Temperature Water in a Concurrent Vertical Flow Arrangement Polybenzobisoxazole ("PBO") dope (14% PBO in PPA) is extruded through a film die and taken-up between rollers. This experimental set-up includes a provision for drawing of the film in the machine direction between the die and the rollers. In this way films of varying thickness and machine direction (MD) orientation are obtained. The maximum drawdown was obtained by having the roller speed be four (4) times the extrusion speed, for the thinnest film studied. After passing through the rollers, the film is sandwiched between Teflon ® fluoropolymer sheets (3 mil) for ease of handling, and stored in a nitrogen purged glove box until use. In the remainder of this Example the term film will designate a 14% PBO in PPA film with the Teflon ® fluoropolymer sheets removed.

The spray coagulation apparatus is opposing sprinkler heads mounted to impinge at the top and normal to the face of a film mounted vertically, with each end constrained between clips to maintain constant length. Thus, the fresh coagulant (in this example tap water) contacts the film at the top and flowed down the length of the film strip as a thin liquid stream.

The film samples are 1" by 4" strips, which are always arranged in the apparatus such that the transverse direction is constrained. This arrangement minimizes film shrinkage during the coagulation process. The technique involves mounting the film in the apparatus and turning on the sprinklers for a designated length of time, varying between 30 sec. and 10 min. Then, the film is removed, patted dry with a paper towel, weighed (wet weight), and the dimensions measured. The film is then dried (unconstrained) overnight (approx. 16 hrs.) in a vacuum oven at 100° C. The dry weight is measured and used to calculate the amount of PPA removed during the coagulation process. The results are given in Table 2. These results show that the removal of PPA from the PBO dope film is a function of both residence time in the spray and film thickness.

TABLE 2

Spray Coagulation of 14% PBO/PPA Films of Various Thickness
weight % = [(final dry weight)/(initial weight)] × 100

| Spray Time (sec) | Film (4-5 mils) | Film (7-8 mils) | Film (12-14 mils) | Film (22-25 mils) |
|---|---|---|---|---|
| 30 | 17.5 | 39.8 | 74.1 | 92.1 |
| 60 | 15.1 | 24.4 | 59.9 | 92.0 |
| 120 | 14.4 | 16.2 | 38.1 | 72.1 |
| 240 | 14.2 | 14.6 | 20.9 | 51.3 |
| 600 | 14.1 | 14.3 | 15.2 | 22.3 |

NOTE:
weight % = 14.0 for complete removal of PPA

EXAMPLE 4

Comparison of PBO Dope Film Coagulation and Washing in Water and Acid/Water Coagulants The films are prepared in a manner similar to that described in Example 1. The starting dope film thickness is 55-65 mils, and the film is stretched 5xMD/5xTD in the simultaneous biaxial mode, giving a stretched dope film thickness of approximately 2-3 mils. The films are mounted on 4" hoops and constrained throughout the entire process. Several different coagulation schemes are followed to examine the rate of removal of PPA from the dope film. The coagulants used are water, 5% $H_3PO_4/H_2O$, and 15% $H_3PO_4/H_2O$. The residual phosphorous is measured using X-ray Fluorescence (XRF), and the data are reported as wt % P on a dry film basis ((wt. P/wt. PBO)×100). The data, Table 3, show that most of the acid is removed very quickly (<60 sec), irrespective of the coagulant used and that the residual solvent level is a function of the $H_3PO_4$ concentration in the coagulation bath.

TABLE 3

PBO dope film (5 × MD/5 × TD; 2-3 mils)
Coagulation and Washing in Water and Acid/Water Coagulants

| Time (minutes) | Phosphorous Level (wt % P) | | |
|---|---|---|---|
| | $H_2O$ | 5% $H_3PO_4/H_2O$ | 15% $H_3PO_4/H_2O$ |
| .5 | — | 3.5 | 7.2 |
| 1 | 0.35 | 3.5 | 6.9 |

TABLE 3-continued

PBO dope film (5 × MD/5 × TD; 2-3 mils)
Coagulation and Washing in Water and Acid/Water Coagulants

| Time (minutes) | Phosphorous Level (wt % P) | | |
|---|---|---|---|
| | $H_2O$ | 5% $H_3PO_4/H_2O$ | 15% $H_3PO_4/H_2O$ |
| 2 | 0.35 | — | 6.4 |
| 4 | 0.32 | — | 6.6 |
| 8 | 0.31 | — | 6.5 |
| 15 | 0.28 | — | 6.3 |
| 20 | 0.27 | 3.25 | — |
| 2 days | 0.12 | 2.77 | — |

Further Experiments 1 min. 15% $H_3PO_4/H_2O$ → 20 min. $H_2O$ → 0.30% P
8 min. 15% $H_3PO_4/H_2O$ → 20 min. $H_2O$ → 0.44% P

EXAMPLE 5

Coagulation and Washing of PBO Dope Film Using Water, Cold Water, and Various Organic Nonsolvents Polybenzobisoxazole ("PBO") dope (14% PBO in PPA) was extruded through a film die, taken-up between rollers, sandwiched between Teflon ® fluoropolymer sheets (3 mil) for ease of handling, and stored in a nitrogen purged glove box until use. The film is oriented by stretching it in a film stretcher. The PBO dope film is tentered in an unsupported manner (Teflon ® fluoropolymer sheets removed), to yield a thin (approximately 2 mils), high oriented (4-5 times biaxial stretch) PBO dope film for the coagulation experiment. The stretched dope film is placed between Teflon ® fluoropolymer sheets and once again stored in a nitrogen purged glove box until use.

Coagulation is carried out by suspending unconstrained 1"×1" pieces of the film from a wire in a 4000 ml beaker filled with the coagulant to be tested. The bath is placed on a magnetic stirrer to provide continuous agitation of the coagulant solution. All coagulations are carried out at room temperature, except for the ice water experiment. The ice water experiment is kept at <4° C. (usually 1°-2° C.). The dope films are weighed before coagulation (initial weight) and then once again after coagulation and drying overnight in a vacuum oven at 100° C. (final dry weight). The results for the various coagulants examined are given in Table 4. The weight % is indicative of the amount of acid solvent removed from the film. The nominal solids content of the film is 14% PBO, which should be the level reached if all the acid solvent is removed.

TABLE 4

Coagulation and Washing of 14%
PBO/PPA Films with Various Coagulants
weight % = [(final dry weight)/(initial weight)] × 100

| Time | Water (2 mils) | Ice Water (2 mils) | Acetone (2 mils) | Methanol (2 mils) |
|---|---|---|---|---|
| 60 sec | 13.9 | 14.1 | 26/6 | 14.6 |
| 2 min | 13.8 | 13.7 | — | — |
| 5 min | 13.8 | 13.9 | 28.5 | 13.8 |
| 10 min | 13.85 | 13.9 | — | — |
| 20 min | — | — | 17.7 | 14.0 |
| 60 min | 13/7 | — | 15.7 | 13.9 |
| 2 hrs | — | — | 15.7 | 13.9 |

NOTE:
weight % = 14.0 for complete removal of PPA

EXAMPLE 6

Staged Coagulation and Washing of PBO Dope Film in Various Acid/Water Baths. Comparative Study of Washing of Stored Coagulated Films The film are prepared in a manner similar to that described in Example 1. The starting dope film thickness in 64 mils, and the film is stretched 4xMD/4xTD in the simultaneous biaxial mode, giving a stretched dope film thickness of approximately 4 mils. The films are mounted on 9" hoops and coagulated and washed for various times in various acid/water baths. In some cases the films are stored wet with the coagulant in Ziploc ® bags for one week between the coagulation and washing steps. After washing, the films are dried at 100° C. for at least 5 hrs. and then heat treated for 1.5 hrs. at 300° C. Unless otherwise noted the films are constrained at all times. The residual %P (dry film basis) levels were determined using X-ray fluorescence.

| PROCESS CONDITIONS | % P | % $H_3PO_4$ |
|---|---|---|
| 60 sec. 30% $H_3PO_4/H_2O$ → stored 1 wk constrained → 30 min. $H_2O$ | 0.12 | 0.37 |
| 60 sec. 30% $H_3PO_4/H_2O$ → stored 1 wk not constrained → 30 min. $H_2O$ | 0.17 | 0.54 |
| 60 sec. 85% $H_3PO_4$ → stored 8 days MD constrained → 24 hrs. $H_2O$ | 0.044 | 0.14 |
| 60 sec. 30% $H_3PO_4/H_2O$ → 60 sec. 15% $H_3PO_4/H_2O$ → 60 sec. 5% $H_3PO_4/H_2O$ → 27 min. $H_2O$ | 0.19 | 0.60 |
| 24 hrs. 30% $H_3PO_4/H_2O$ → 30 min. $H_2O$ | 0.16 | 0.51 |
| 30 min. $H_2O$ | 0.29 | 0.92 |

EXAMPLE 7

Long Term Coagulation of Oriented PBO Dope Film With and Without Steam

Two polybenzoxazole dope films were stretched 5 times biaxially and coagulated on hoops in room temperature water for five months, with water changes frequently for the first several days and weekly thereafter. After 5 months sample I was removed from the bath, dried, and heat treated. Sample II was removed from the bath (but maintained wet at all times), and then steam leached for 3 hours with wet steam before removing to be dried and heat treated in a similar manner. The residual phosphorus levels were measured using X-ray fluorescence, for three discs cut from each film (designated a, b, c). The testing was repeated to check for reproducibility (#1 and #2) for each disc. The steam leaching was effective in removing additional phosphorous from the film.

| Sample No. | | wt. P (ppm) #1 | #2 |
|---|---|---|---|
| I | a | 400 | 463 |
| (5 months $H_2O$ bath) | b | 454 | 467 |
| | c | 515 | 514 |
| | AVG | 456 | 481 |
| II | a | 316 | 330 |
| (5 months $H_2O$ bath and 3 hours steam) | b | 372 | 339 |
| | c | 459 | 408 |
| | AVG | 382 | 360 |

EXAMPLE 8

Coagulation and Washing of PBO Dope Film with Hot Coagulants

The films are prepared in a manner similar to that described in Example 1. The starting dope film thickness is 55 mils, and the film is stretched 5xMD/5xTD in the simultaneous biaxial mode, giving a stretched dope film thickness of approximately 2–3 mils. The films are mounted on 9" hoops and coagulated and washed for different times in various acid/water baths at room temperature (RT), 45° C., and/or 85° C. After washing, the films are dried at 100° C. for at least 5 hrs and then heat treated for 1.5 hrs. at 300° C. The films are constrained throughout the process. The residual %P (dry film basis) levels are determined using X-ray fluorescence.

These results are shown in Table 5.

TABLE 5

| PROCESS CONDITIONS | % P | % $H_3PO_4$ |
|---|---|---|
| 30 min. $H_2O$ | 0.29 | 0.92 |
| 30 min. $H_2O$ at 45° C. | 0.28 | 0.88 |
| 30 min. $H_2O$ at 85° C. | 0.15 | 0.47 |
| 1 min. 15% $H_3PO_4/H_2O$ at 45° C. → 29 min. $H_2O$ at 45° C. | 0.2 | 0.63 |
| 1 min. 15% $H_3PO_4/H_2O$ at 85° C. → 29 min. $H_2O$ at 85° C. | 0.074 | 0.23 |
| 1 min. 30% $H_3PO_4/H_2O$ at 25° C. → 30 min. $H_2O$ at 85° C. | 0.13 | 0.41 |
| 1 min. 30% $H_3PO_4/H_2O$ at 25° C. → 1 min. $H_2O$ at 85° C. | 0.14 | 0.44 |
| 1 min. 30% $H_3PO_4/H_2O$ at 85° C. → 30 min. $H_2O$ at 85° C. | 0.096 | 0.30 |
| 1 min. 50% $H_3PO_4/H_2O$ at 85° C. → 30 min. $H_2O$ at 85° C. | 0.10 | 0.32 |

EXAMPLE 9

Coagulation with Added Surfactant

Polybenzobisoxazole ("PBO") dope (14 wt % PBO in polyphosphoric acid ("PPA")) is extruded through a film die, taken-up between rollers, sandwiched between Teflon ® fluorocarbon polymers sheets (3 mil) for ease of handling, and stored in a nitrogen purged glove box until use. The starting material is a 14 wt % PBO in PPA film with the teflon sheets removed. A 1"×1" unconstrained section of PBO film (15 mil thickness and 0.4785 g) is placed in a bottle containing 100 g of distilled water with 100 ppm of sodium lauryl sulfate added as a surfactant. The solution is continuously shaken and after 604 seconds (approximately 10 mins), the film is removed and then dried at 100° C. in a vacuum oven for 12 hours. The dry film weighed 0.0710 g, indicating 99.0% removal of the polyphosphoric acid from the film.

EXAMPLE 10

Ultrasonic Coagulation

Polybenzobisoxazole ("PBO") dope (14 wt % PBO in polyphosphoric acid ("PPA")) is extruded through a film die, taken-up between rollers, sandwiched between Teflon ® fluorocarbon polymer sheets (3 mil) for ease of handling, and stored in a nitrogen purged glove box until use. The starting material is a 14 wt % PBO in PPA film with the teflon sheets removed. A 1"×1" unconstrained section of PBO film (15 mil thickness and 0.4962 g) is placed in 100 g of distilled water in a bottle under ultrasonic agitation for 1164 seconds (approximately 20 mins). The film is then dried at 100° C. in the vacuum oven for 12 hours. The dry film weighed 0.0719 g, indicating 99.4% removal of the polyphosphoric acid from the film.

EXAMPLE 11

Failure of Further Removal of Phosphorus From Dried Film

The polybenzobisoxazole dope film sample is stretched 4.5X biaxially, coagulated on hoops in room temperature water for 5-6 days, and dried for 24 hours in a vacuum oven. Three discs are cut from PBO film A (designated 1,2,3) and then the remainder of the film is steamed leached for ten hours in wet steam. The film is dried once again for 24 hours in a vacuum oven, and another three discs are cut from PBO film A (designated 4,5,6). The residual phosphorus levels are measured using X-ray fluorescence, for three discs cut from each film. The testing is repeated to check for reproducibility.

| Sample No. | Coagulation/Leaching | wt. P (ppm) #1 | #2 |
| --- | --- | --- | --- |
| A -1 | 5-6 days room temp. | 765 | 751 |
| -2 | H₂O and drying | 795 | 853 |
| -3 | | 712 | 757 |
| A -4 | 5-6 days room temp. | 824 | 830 |
| -5 | H₂O drying followed by | 713 | 697 |
| -6 | 10 hours steam | 690 | 705 |

EXAMPLE 12

Coagulation and Washing of Thick PBO Dope Film Using Sequential Temperature Baths Polybenzobisoxazole ("PBO") dope (14% PBO in PPA) is extruded through a film die, taken-up between rollers, sandwiched between Teflon ® fluorocarbon polymer sheets (3 mil) for ease of handling, and stored in a nitrogen purged glove box until use. Various thickness films were made by varying the die gap. The coagulation baths are 2000 ml beakers containing 1900 ml of deionized water. The PBO film is cut into 1"×1" unconstrained samples which are suspended from a wire in the well-stirred bath. The samples are weighed prior to coagulation (initial weight), and again after coagulation and drying in a vacuum oven at 110° C. for 16 hrs (final weight). The experiments are conducted in room temperature (RT) water; in 80°-95° C. water (hot); and in a sequence of Hot/RT or RT/Hot baths. For the sequential baths, the total residence time reported is split 50/50 between the two baths. For example, in the case of the Hot/RT experiment at 120 sec., the sample is suspended 60 sec. in the hot bath then removed and immediately placed for 60 sec. in the RT bath.

The weight loss of PPA (as measured by the weight %)as a function of bath residence time in either single or sequential baths, and for films of different thicknesses, is reported in the following table.

Coagulation and Washing of 14% PBO/PPA Films of Various Thicknesses in Sequential Temperature Baths
weight % = [(dry weight)/initial weight)] × 100

| Time (secs) | 36 mils Film | | | | 8.5 mils Film | | | |
| --- | --- | --- | --- | --- | --- | --- | --- | --- |
| | RT | HOT | HOT/RT | RT/HOT | RT | HOT | HOT/RT | RT/HOT |
| 30 | 95 | 83.3 | — | — | 60.3 | 31.8 | — | — |
| 60 | 90 | 75.4 | 83.3 | 76.8 | 35.8 | 18.5 | 31.3 | 17.5 |
| 120 | 83 | 61.7 | 71.9 | 64.5 | 17 | 14.4 | 16.8 | 14.0 |
| 180 | 75.8 | 55.9 | 65.2 | 53 | 14 | 13.8 | 15.0 | 13.8 |
| 240 | 68.9 | 45 | 57.5 | 43.7 | 13.9 | 13.9 | 14.5 | 13.9 |
| 360 | 54.4 | 33.3 | 46.7 | 27.9 | | | | |
| 480 | 45 | 26.5 | 42.6 | 19.7 | | | | |

NOTE:
weight % ~14.0 for complete removal of PPA.

What is claimed is:
1. A process for coagulating a polybenzoxazole film comprising the steps of:
   a) contacting a lyotropic polybenzoxazole dope film that is constrained in at least two directions with a coagulant under conditions such that the polybenzoxazole polymer separates as a gelled moiety with the structure set such that further removal of solvent will result in no more than a 5% increase in the force necessary to constrain the film; and
   b) removing some of the constraint on the film such that the film is constrained in at most one direction; and
   c) subjecting the coagulated film to washing with a suitable washing medium under conditions such that the desired level of residual solvent in the film is reached while ensuring that the film is not allowed to dry out until said desired levels of residual solvent in the film have been reached.

2. The process of claim 1 wherein said coagulant comprises a mixture of acid and water that contains up to 85 percent phosphoric acid, and the temperature of said coagulant is from about 5° C. to about 95° C. and wherein said residual solvent is a phosphorous containing moiety and wherein said desired level of residual solvent is 3000 ppm or less.

3. A process for coagulating a polybenzoxazole film comprising the steps of:
   a) contacting a lyotropic polybenzoxazole dope film that is constrained in at least two directions with a coagulant under conditions such that the polybenzoxazole polymer separates as a gelled moiety with the structure set such that upon release of constraint further removal of solvent would result in no more than 5% shrinkage of the coagulated film; and
   b) removing some of the constraint on the film such that the film is constrained in at most one direction; and
   c) subjecting the coagulated film to washing with a suitable washing medium under conditions such that the desired level of residual solvent in the film is reached while ensuring that the film is not allowed to dry out until said desired levels of residual solvent in the film have been reached.

4. The process of claim 3 wherein said coagulant comprises a mixture of acid and water that contains up to 85 percent phosphoric acid, and the temperature of said coagulant is from about 5° C. to about 95° C. and wherein said residual solvent is a phosphorus containing moiety and wherein said desired level of residual solvent is 3000 ppm or less.

5. The process of claim 1 in which said film is exposed to more than one coagulant in a sequenced order.

6. The process of claim 3 in which said film is exposed to more than one coagulant in a sequenced order.

* * * * *